…

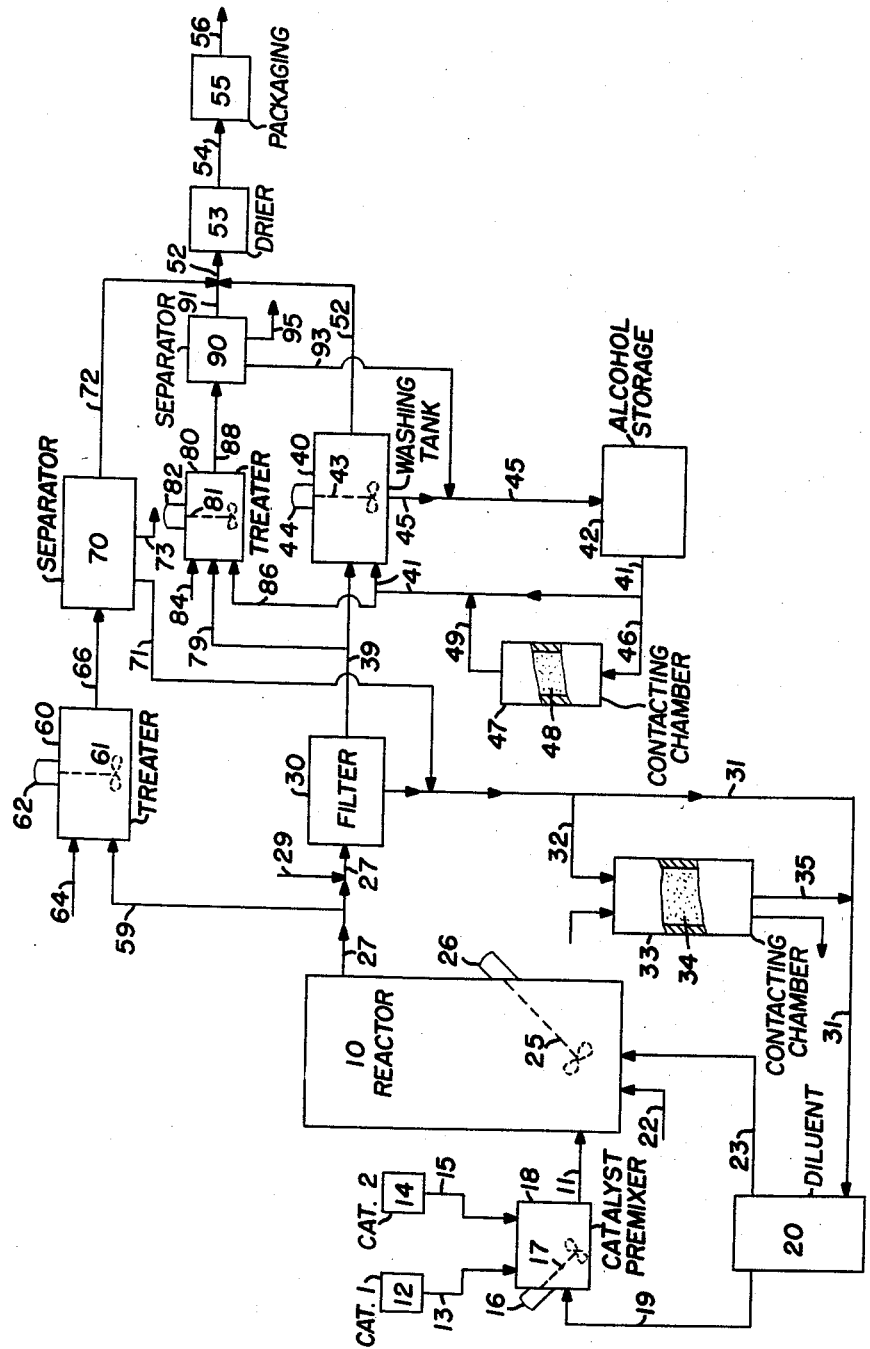

United States Patent Office 2,929,808
Patented Mar. 22, 1960

2,929,808

REMOVAL OF METAL CONTAMINANTS IN POLYMERIZATION PROCESSES

James Francis Ross and Elroy Merle Gladrow, Baton Rouge, La., assignors to Esso Research and Engineering Company, a corporation of Delaware Application April 4, 1956, Serial No. 576,122

3 Claims. (Cl. 260—94.9)

This invention relates to polymerization and more particularly relates to the removal of metal contaminants in polymerization processes. Still more particularly, the present invention relates to an improved method for removing metal contaminants from polymeric products, diluents and washing agents in a polymerization process wherein monomers are polymerized in the presence of a catalyst obtained by mixing reducing metal compound with reducible metal compound.

The art is well familiar with the preparation and uses of a wide variety of polymeric products. More specifically, polymeric products are used in a wide variety of applications such as for plastics, film-forming materials, tires, lubricant additives and the like. Many of these polymeric products are prepared employing metal compounds as catalysts in the polymerization reaction. In many instances it is highly desirable to prepare a polymeric product having a low metal content. For example, the presence of metals (or ash-forming ingredients) unfavorably affects the electrical properties and color of the polymeric products.

Recently a new method has been developed for preparing polymeric products wherein monomers are polymerized in the presence of a catalyst obtained by mixing a reducing metal compound (e.g., aluminum trialkyl or dialkyl aluminum chloride) with a reducible metal compound (e.g., titanium tetrachloride). This process has been found to be both economical and effective. Perhaps the most serious problem encountered in this process is the presence of a relatively high proportion of metal contaminants in the final polymeric products. Conventional polymer purification techniques have been generally unsuccessful in reducing the proportion of metal contaminants or ash-forming ingredients below the levels desired for good color and good electrical properties. Thus the finding of a method for reducing the proportion of metal contaminants in the polymeric products prepared by this method is essential to its commercial success in a number of fields of application.

It is highly desirable in this new polymerization process to recycle the diluents and washing agents to the process. For the most effective operation, it is desirable to remove metal contaminants from these materials. Thus there is also a need for an effective method for removing metal contaminants from the diluents and washing agents used in this new polymerization process.

A novel method has now been found for removing metal contaminants from the polymeric products, diluents and washing agents employed in the polymerization process wherein monomers are polymerized in the presence of polymerization catalyst obtained by mixing reducing metal compound with reducible metal compound. More particularly, the improved process of the present invention comprises removing these metal contaminants from the polymeric products, diluents and/or washing agents by contacting these materials with ion exchange resins. More specifically, in accordance with the present invention, metal contaminants can be removed from the following materials by contacting them with ion exchange resins: (1) the inert liquid diluent employed in the polymerization reaction which is subsequently separated from the polymeric product: (2) the washing agent employed to wash the polymeric product which is separated from the polymeric products; (3) a mixture of the polymeric product and inert liquid diluent; (4) a mixture of the polymeric product and washing agent and (5) a mixture of the polymeric product, inert liquid diluent and washing agent. In those cases where the metal contaminants are removed by ion exchange from either the inert liquid diluent or the washing agent, it is preferred to pass these materials through a bed of the ion exchange resin. The present invention is particularly applicable to the polymerization of ethylene to form polyethylene, and it is particularly preferred to employ as ion exchange resins the acid forms of sulfonated styrene-divinyl benzene ion exchange resins.

The new type of polymerization process is conventionally carried out by polymerizing monomers such as ethylene in the presence of an inert liquid diluent and a polymerization catalyst obtained by mixing a reducing metal compound with a reducible metal compound in an inert liquid diluent. Upon completion of the polymerization reaction, the polymeric product such as polyethylene is separated usually by filtration from the remainder of the reaction mixture (which is principally the inert liquid diluent), and then the separated polymeric product is washed with a liquid washing agent, dried and packaged.

The catalyst employed in this type of polymerization reaction is formed simply by mixing a metal compound having reducing properties with a reducible metal compound in the presence of an inert liquid diluent. More particularly, the metal compound having reducing properties is generally an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, these aluminum compounds have the general formula

where R and R′ are members selected from the group consisting of hydrogen, alkyl radicals and aryl radicals and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids. The most commonly used aluminum compounds are (1) dialkyl aluminum monohalides containing about 2 to 4 carbon atoms in the alkyl groups and chlorine or bromine atoms, particularly chlorine atoms; (2) aluminum trialkyls containing about 2 to 4 carbon atoms in the alkyl groups and (3) mixtures of (1) and (2).

The reducible metal compound is one of a metal of groups IV—B, V—B, VI—B and VIII of the periodic system of elements. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides such as oxychlorides, freshly precipitated oxides or hydroxides, organic compounds such as alcoholates, acetates, benzoates or acetyl acetonates. The most commonly used salts are those of titanium, zirconium, thorium, uranium and chromium. Titanium salts are particularly useful, such as titanium tetrachloride, titanium oxychloride or titanium acetyl acetonate.

If desired, a pre-reduced reducible metal compound may be employed as the polymerization catalyst in lieu of the mixture of reducing metal compound with reducible metal compound. An example of a pre-reduced reducible metal compound is titanium trichloride. Mixtures of two or more pre-reduced reducible metal compounds, as well as mixtures of pre-reduced reducible metal compounds with reducing metal compounds, may also be employed as the polymerization catalysts.

As stated above, the catalyst mixture is prepared simply by mixing the metal compound having reducing properties with the reducible heavy metal compound in the presence of an inert liquid diluent. Generally the molar ratio of the reducing metal compound to the reducible metal compound is in the range of about 1:5 to 12:1, more preferably about 1:2 to 3:1. The catalyst mixture is prepared generally using an inert liquid diluent in an amount sufficient to form a mixture containing about 0.2 to 25.0 weight percent of the catalyst components, and employing mixing temperatures in the range of about —20 to 150° F. and mixing times of about 5 minutes to 24 hours. The optimum conditions for preparing the catalyst depend in large measure on the particular aluminum alkyl used as the reducing agent. For example, aluminum triethyl can be employed using relatively low concentrations and temperatures to form an active catalyst. On the other hand, when using aluminum diethyl chloride at approximately .5 weight percent concentration, heating times of about 15 to 30 minutes at temperatures of about 120 to 140° F. give the most active catalyst. When the two catalyst components are mixed in the presence of the inert liquid diluent, a precipitate is generally formed which is insoluble in the inert liquid diluent.

A wide variety of polymeric products can be prepared by employing the above-described catalyst mixtures of a reducing metal compound with a reducible metal compound. These catalysts are particularly effective for polymerizing ethylene but are also effective for preparing other homopolymers or copolymers, particularly those of $C_2$—$C_3$ monolefinic hydrocarbon monomers. For example, polypropylene and copolymers of ethylene and propylene can be prepared by this polymerization method.

Generally an inert liquid diluent will be employed in the polymerization process to facilitate the polymerization reaction. The amount of the inert liquid diluent employed in the polymerization process should be such that the final polymeric product in the reaction mixture does not exceed about 40 weight percent so that a relatively fluid reaction mixture is produced. Generally the amount of inert diluent is such that the polymeric product in the final reaction mixture is in the range of about 1% to 25% by weight. The proportion of catalyst, based on the inert liquid diluent, will generally be in the range of about 0.05 to 0.5 weight percent, usually about 0.1 to 0.3 weight percent.

The inert liquid diluents employed in the preparation of the catalyst as well as in the polymerization reaction itself are preferably hydrocarbons or halogenated hydrocarbons. More particularly, aliphatic hydrocarbons, aromatic hydrocarbons, halogenated aliphatic hydrocarbons and halogenated aromatic hydrocarbons as well as mixtures thereof may be employed. One particular class is inert liquid diluents which is employed quite extensively is the $C_5$ to $C_{10}$ saturated aliphatic hydrocarbons including pentane, hexane, heptane, octane, nonane and decane. Aromatic hydrocarbons such as benzene, toluene, xylenes, may also be employed. Also, halogenated hydrocarbons such as chlorobenzene, chloroform, bromobenzene, bromoform, may be employed. Also, highly refined mineral or petroleum oils boiling within the range of about 300° F. to 750° F. (e.g. 350° F. to 550° F.), may be employed as inert liquid diluents. In addition to the inert liquid diluents mentioned above, other suitable diluents include saturated cyclic paraffin, such as cyclohexane, cyclopentane, methyl cyclohexane.

The polymerization reaction conditions, that is, time, temperature and pressure, are adjusted to produce polymers or copolymers having molecular weights generally of at least about 2,000, usually at least about 10,000. Polymeric products having molecular weights up to 2,000,000 to 5,000,000 or higher may be prepared. Generally, temperatures in the range of about —40 to 200° C., usually about 20° to 80° C. (e.g., about 50° to 60° C.), are employed. Higher temperatures can be employed if desired, but temperatures above about 250° C. are undesirable generally since the catalyst decomposes to a considerable extent at this temperature. In general, pressures in the range of about 1 to 250 atmospheres or higher are employed. If desired, subatmospheric pressures can be employed with certain monomers. The polymerization of ethylene can be carried out conveniently by employing pressures of about 1 to 10 atmospheres. An advantage of this process is that relatively low pressures can be employed. In order to obtain polymeric products having molecular weights above about 2,000, a polymerization reaction time of at least about 15 minutes will be required. Generally, polymerization reaction times in the range of about 15 minutes to 24 hours, usually about 1 to 6 hours, will be employed.

Upon completion of the polymerization reaction, the polymeric product is conventionally separated from the reaction mixture by filtration or distillation, the polymeric product washed with materials such as alcohols and then dried by heating, preferably under vacuum. Washing agents which are conventionally employed in the polymerization process include alcohols, acetone, esters, ethers, Cellosolves and aqueous acids such as HCl. Saturated aliphatic alcohols or alkanols containing about 1 to 5 carbon atoms have been employed extensively as washing agents. Examples of these alcohols include methyl, ethyl, propyl and butyl alcohols. Generally about 1 to 6, usually about 2 to 4 gallons of washing agent will be empoyed per pound of the polymeric product.

The ion exchange resins employed in the present invention are cation exchange resins which are in the acid form. The present invention is particularly advantageously carried out using sulfonated (or phosphonated) polystyrene resins and especially sulfonated polystyrene resins which contain as constituent monomers about 50 to 99 weight percent of styrene and about 1 to 50 weight percent of divinyl benzene, preferably 75 to 98% by weight of styrene and 2 to 25 weight percent of divinyl benzene, and especially about 84 to 98 weight percent of styrene and 2 to 16 weight percent of divinyl benzene. Such resins are well known in the art and are marketed commercially and are therefore particularly useful in the present invention. It will be understood, however, that the present invention is also applicable to other ion exchange resins. For example, instead of styrene, it is permissible to use other monovinyl aromatic compounds such as p-methyl styrene, p-ethyl styrene, α-methyl styrene, α-methyl p-methyl styrene or other dimethyl styrenes, p-chlorostyrene, dichlorostyrenes, and so forth. While, in general, compounds having the vinyl group in para position to the alkyl or halogen substituents are preferred, other isomers are similarly useful also. Likewise, instead of using divinyl benzene as the chemical cross-linking agent, other polyvinyl aryl compounds may be used such as divinyl toluene, divinyl xylene, divinyl ethyl benzene, divinyl chlorobenzene, divinyl ethers, divinyl naphthalene, and the like. It will also be understood that the present invention is applicable to such resins containing minor amounts of monomers other than styrene and divinyl benzene (or similar compounds) such as, for example, butadiene, isoprene and isobutylene.

These resins may be prepared in a variety of ways from a variety of raw materials. For instance, the sulfonation or equivalent acid treatment may be applied to a monomer such as styrene which is subsequently polymerized into a suitable high molecular weight ion-exchange resin. Preferably, however, the organic resin is formed first and then the acid groups are introduced by treating the solid resin in suitably subdivided or granulated form.

The polymerization of the aforementioned ingredients can be carried out by any of the well-known methods, e.g., by simple heating at an elevated temperature such as 100° C. for a suitable length of time, such as 10 days. However, it is preferable to use a catalytic amount of an oxygen-yielding compound such as benzoyl peroxide, ammonium persulfate, potassium persulfate, sodium perchlorate, sodium perborate, ozone, ozonides, etc., with temperatures of about 20–120° C., and a polymerization time inversely of a week to as short as a few hours. The polymerization can be carried out either in homogeneous phase or in emulsion. For instance, satisfactory materials can be prepared according to the procedure described in Patent No. 2,089,444 or 2,500,149. Depending on the technique employed, the polymeric resin can be produced either in the form of nearly spherical hard granules of a proper size for further use, or the polymeric resin can be produced in the form of larger masses which are reduced to the desired particle size by crushing or cutting.

In making the aforementioned organic materials into the desired cation-exchange resins, they are sulfonated (or phosphonated) in a manner otherwise well known so as to introduce on the average about 0.25 to 3, preferably about 0.5 to 2, inorganic acid radicals per benzene nucleus of the polymeric resin. Suitable sulfonation agents include concentrated or fuming sulfuric acid, chlorosulfonic acid, sulfur trioxide in nitrobenzene, etc. An excess of the sulfonating agent is used. Depending on the sulfonating agent used, temperature of sulfonation may be in the range of about −20° to 200° C., preferably −20° to +50° C. in the case of chlorosulfonic acid. Higher temperatures are best with sulfuric acid. The resin is preferably in a relatively coarse particle size such as 20–100 mesh so as to be suitable for direct use in the eventual olefin hydration process. Thus, the subdivided copolymer, e.g., one containing 90% of combined styrene and 10% of combined divinyl benzene, can be mixed with an excess of chlorosulfonic acid, e.g., about 6 parts acid per part of copolymer, briefly heated at reflux temperature for about 3 minutes and subsequently the mixture is held at room temperature for about 50 hours. Finally, a large excess of water is added to the mixture, and the latter is then filtered, washed and dried. In a typical operation a yield of about 235% of sulfonated resin (based on copolymer) is thus obtained. This sulfonated resin contains an average of about 1.77 sulfonic acid groups in each of its aromatic nuclei. At lower temperatures a less extensively sulfonated product is obtained, e.g., one containing a single sulfonate group per aromatic ring.

To minimize physical disintegration of the hard copolymer during sulfonation, the granules may first be swelled in a suitable solvent such as benzene, toluene, xylene, carbon tetrachloride, trichloroethylene, tetrachloroethylene and the like, in a manner substantially as described in Patent No. 2,500,149. For instance, some granulated copolymers can be swelled by contact with 10 to 50 volume percent of a solvent such as tetrachloroethylene to as much as about 170% of the original copolymer volume. However, in most instances even slight swelling is helpful in reducing subsequent disintegration. After draining off excess solvent, the swollen granules are then treated with one of the sulfonating agents mentioned above, e.g., 98% sulfuric acid.

The sulfonation reaction starts at the surface of each granule and is continued until the entire granule has been penetrated by the acid to give a complete reaction. The strength of the acid decreases as the sulfonation proceeds. After completion of the reaction, the remaining acid is washed out with water, or first neutralized and then washed. As water replaces the acid, further swelling of the granules may occur, up to about 25%. Too rapid dilution with water tends to weaken the resin structure and may result in subsequent fracture of the granules. It is, therefore, advisable to replace the residual acid by slow addition of water over a period of as much as 24 hours or more. Either stepwise or continuous water addition is suitable.

The washed sulfonated product is generally saturated with water and is in a swollen state. Thus, commercially available sulfonated resins normally contain from about 40 to 70% water. It is advisable to store such resins in water-tight containers under conditions which will prevent drying out of the resin as undue loss of this water content may lead to disintegration of the granules upon subsequent contact with water. For instance, a resin originally containing 55% moisture may be dried out at 60% relative humidity to an equilibrium moisture content of only about 30%. When such a partially dried-out resin is placed in water, water absorption may be so rapid that severe disintegration of the granules takes place.

It will be understood, of course, that the described polystyrene type ion-exchange resins as well as their preparation are well known and readily available as commercial products. For instance, a particularly useful resin for purposes of the present invention is a commercial cation-exchange resin known under the trade name Dowex 50X8 and made up by the Dow Chemical Company. This is a sulfonated resinous copolymer of about 92% styrene and 8% divinyl benzene, which contains about 44 to 50% moisture and about 12 to 16% sulfur in the sulfonate form, based on anhydrous resin. This material has approximately the same acidity as benzene sulfonic acid. Useful materials of this type having a somewhat higher divinyl benzene content are also marketed under the names of Dowex 50X12 as well as Dowex 50X16. All of these materials are brown in color. Another material is Dowex 50WX8 which is cream colored and especially stable in the mechanical sense due to virtually complete absence of internal strains as shown by inspection under polarized light. This material is prepared by introducing the sulfonic acid groups into the polymer under special conditions so that oxidation of the polymer is almost completely avoided.

Other sulfonated polystyrene ion-exchange resins are sold by the Rohm and Haas Company under the "Amberlite" trademark, particularly "Amberlite-IR-120." All of these sulfonic acid type ion-exchange resins are usually sold in the form of sodium salts which can be readily converted or regenerated to the acid type by washing with an aqueous solution of sulfuric or hydrochloric acid in a manner well known by itself. In such regeneration the hydrogen ions of the wash acid replace the sodium ions of the resin. The ion-exchange resins in their free acid form have an acidity of about 1.5 to 10 milliequivalents per gram, depending on the resin base and extent of sulfonation. The preferred commercial resins usually have an acidity of about 5 milliequivalents per gram. Other ion exchange resins may be employed, including the phosphonated resins corresponding to the sulfonated ion exchange resins described above.

The improved process of the present invention will be best understood by reference to the attached drawing which is a diagrammatic showing of a polymerization process for polymerizing monomers in the presence of catalyst obtained by mixing reducing metal compound with reducible metal compound and wherein the polymeric products, inert liquid diluents and/or washing agents are contacted with ion exchange resins in accordance with the present invention.

Referring now to the drawing, reference numeral 10 designates a polymerization reactor employed to polymerize monomers such as ethylene in the presence of a catalyst obtained by mixing reducing metal compound with reducible metal compound. The reducing metal compound employed in the process is stored in tank 12 and is passed into catalyst preparation tank 18 through line 13. The reducible metal compound is stored in tank 14 and is passed into catalyst preparation tank 18 through line 15. The inert liquid diluent in which a reducing metal compound and reducible metal compound are mixed is introduced from tank 20 through line 19 to catalyst preparation tank 18. The resultant suspension of catalyst in inert liquid diluent is maintained in this form by means of agitator 17 driven by motor 16. The catalyst suspension in tank 18 is passed to reactor 10 through line 11. The monomer such as ethylene, propylene, etc. or mixtures thereof is introduced to polymerization reactor 10 through line 22. Inert liquid diluent is introduced to reactor 10 from tank 20 through line 23. The resultant reaction mixture in reactor 10 is thoroughly mixed by means of agitator 25 driven by motor 26.

The resultant reaction mixture is withdrawn from reactor 10 through line 27 and is passed to filter 30 wherein the polymeric product is separated from the remainder of the reaction mixture. The polymeric product is then passed through line 39 to washing apparatus 40. The remainder of the reaction mixture which is chiefly inert liquid diluent is withdrawn from filter 30 through line 31. The polymerization process may be carried out either on a batch or continuous basis. In a continuous operation, the inert liquid diluent (containing a small amount of catalyst, etc.) is preferably continuously recycled back to tank 20 for subsequent use in the polymerization process carried out in reactor 10. In certain instances, a small amount of catalyst deactivator may be added to the polymerization reaction mixture passing from reactor 10 through line 27 by means of line 29. Such catalyst deactivators include alcohols, acetone and the like. However, generally, this is not usually a preferred method of operation since it is usually desirable to recycle the inert liquid diluent to the polymerization process and in this case the catalyst deactivator would act as a polymerization poison.

The polymeric product in washing apparatus 40 is combined with a washing agent such as those described heretofore. This washing agent is passed through line 41 from tank 42. The polymeric product and washing agent are thoroughly admixed in washing apparatus 40 by means of stirrer 43 operated by motor 44. Then the washing agent is separated (e.g. by filtration) from the polymeric product, the washing agent being passed through line 45 to tank 42 and the polymeric product being passed through line 52 to drier 53 and thereafter through line 54 to packaging apparatus 55 and is removed therefrom through line 56. The description of the drawing thus far has related to those steps which are conventional in the instant polymerization process. The improvements in this process which constitute the present invention will now be described in the following paragraphs.

The inert liquid diluent passing from filter 30 through line 31 to tank 20 contains small amounts of soluble catalyst components. (It will be noted that essentially all of the insoluble catalyst components are separated from the inert liquid diluent in filter 30.) If these soluble catalyst components are not removed, the concentration of the metal components (which are in a relatively inactive form as compared to fresh catalyst) would continue to build up in the present process and thus further complicate the already-existing problem of removing ash from the polymeric product. In accordance, therefore, with the present invention, the inert liquid diluent flowing through line 31 is passed through line 32 into contacting chamber 33 which contains an ion exchange resin of the type described heretofore in detail. Preferably the ion exchange resin is in the form of a bed 34 in contacting chamber 33. The bed form is particularly advantageous when the present polymerization process is carried out on a continuous basis. Thus in accordance with the present invention, the inert liquid stream is passed through line 32 through contacting chamber 33 and bed 34 of ion exchange resin and is withdrawn through line 35 and is then passed through line 31 to tank 20. It will be understood that other methods of contacting the inert liquid diluents with the ion exchange resin may be employed. For example, the inert liquid diluent may be stirred with particles of ion exchange resin and then the inert liquid diluent separated and returned to the present process. Also, more than one ion exchange bed (either in series or in parallel) may be employed, if desired. It has been found that by contacting the inert liquid diluent with an ion exchange resin, essentially all of the metal contaminants are removed therefrom.

The contacting of the inert liquid diluent with the ion exchange resin may generally be carried out at temperatures of about ambient temperature to 250° F. (e.g. about 120 to 200° F.). Generally it will be convenient to carry out this contacting operation at about atmospheric temperature and atmospheric pressure. Higher or lower pressures may be employed, however, if desired. If the present contacting operation is to be carried out on an essentially batch basis, that is, by merely mixing the inert liquid diluent with the ion exchange resin, average contacting times of about 1 to 60 minutes, preferably about 3 to 30 minutes, will be employed. In this case, about 0.5 to 50, preferably about 2 to 20, parts by volume of inert liquid diluent per part by volume of ion exchange resin may be employed. In the case where the inert liquid diluent is passed through a bed of ion exchange resin, treating rates up to about 1000, preferably about 5 to 150 v./v./hour (volume of liquid per volume of ion exchange resin per hour) may be employed. In this case the bed of ion exchange resin is generally replaced when the percent of removal of metal contaminants from the inert liquid diluent drops below about 50%, preferably below 90% and more preferably below about 99%.

The present method for removing metal contaminants from the inert liquid diluent is superior to other methods. For example, in other methods wherein the inert liquid diluent is washed with water or alcohol to remove metal contaminants therefrom, there is generally introduced into the inert liquid diluent small amounts of the water or alcohol. This water or alcohol cannot be tolerated even in relatively small concentrations in the polymerization reaction as such materials act as catalyst poisons. Distillation as a means of separating these metal contaminants from the inert liquid diluent is not only less effective than the present method but is also considerably less economical.

For the most effective washing operation in washing apparatus 40, the washing agent introduced thereto through line 41 from tank 42 is preferably essentially free of metal contaminants. It is, of course, desirable to be able to reuse the washing agent. Conventional methods of removing metal contaminants from the washing agent, such as distillation, are relatively ineffective and uneconomical. In accordance with the present invention, these problems are eliminated by contacting the washing agent with ion exchange resin. Thus, according to the present invention, the washing agent is passed from tank 42 through lines 41 and 46 to contacting chamber 47 which contains ion exchange resin, preferably in the form of bed 48. The treated and purified washing agent is then passed through lines 49 and 41 to washing apparatus 40.

In the preferred contacting operation, the washing agent is passed through a bed of the ion exchange resin. However, it will be understood that other contacting techniques may be employed such as, for example, mixing the ion exchange resin in particle form with the washing agent. In this latter case, about 0.5 to 50, preferably about 2 to 20 parts by volume of washing agent per part by volume of ion exchange resin may be employed. Generally, mixing times of about 1 to 60 minutes, preferably about 3 to 30 minutes, will be employed. In the preferred method of operation wherein the washing agent is passed through a bed of ion exchange resin, treating rates up to about 1000, preferably about 5 to 150 v./v./hour will be employed. In this method of operation, the bed of ion exchange resin is generally replaced when the percent of metal removal from the washing agent drops below about 50%, preferably below 90%, and more preferably below 99%. Generally this contacting operation will be carried out at temperatures of about atmospheric temperature to 250° F. (e.g. about 120° to 200° F.). Usually, it will be most convenient to carry out the contacting operation at about the same temperature as the washing step, viz about 120°–200° F. and atmospheric pressure. Higher or lower pressures may be employed if desired.

It is particularly preferred to carry out the washing operation in washing apparatus 40 on a continuous basis. In this case, the separated polymeric product from filter 30 is continuously passed to washing apparatus 40 and washing agent is also continuously introduced thereto through lines 49 and 41. The polymeric product and washing agent are thoroughly mixed by means of stirrer 43 and washed polymeric product is continuously withdrawn through line 52 and washing agent continuously withdrawn through line 45 for passage to tank 42. The washing agent is continuously passed from tank 42 through lines 41 and 46 into contacting chamber 47 and through bed 48 and then passed continuously through lines 49 and 41 to washing apparatus 40 to thus complete the cycle. In this way, it is possible to wash the polymeric product in washing apparatus 40 with a washing agent which is essentially free of metal contaminants.

In another embodiment of the present invention, the reaction mixture from reactor 10 is passed through lines 27 and 59 into treater 60 which is equipped with an agitator 61 driven by motor 62. Ion exchange resin is introduced through line 64 into treater 60 and the contents of treater 60 are thoroughly mixed by means of agitator 61. The contacting of the reaction mixture in treater 60 with the ion exchange resin is carried out generally at a temperature of about ambient to 250° F. (e.g. about 120° to 200° F.). The residence time of the reaction mixture in treater 60 is generally about ¼ to 2, preferably about ½ to 1 hour. About 10 to 200, preferably about 50 to 160 parts by volume of polymerization mixture are employed per part by volume of the ion exchange resin.

The mixture of the polymerization reaction mixture and ion exchange resin is then withdrawn from treater 60 and passed through line 66 to separator 70 wherein the polymeric product, e.g. polyethylene, is separated from the inert liquid diluent and the ion exchange resin. The inert liquid diluent is withdrawn through line 71 and is preferably passed to line 31 for recycle back to polymerization reactor 10. The separated polymeric material is passed through lines 72 and 52 to drier 53 and then through line 54 to packaging apparatus 55 and is then withdrawn through line 56. The separated ion exchange resin is withdrawn from separator 70 through line 73. The separated ion exchange resin may then be regenerated as will be described later in detail, after which the regenerated ion exchange resin may be recycled to the process.

Any conventional method of separation may be employed in separator 70. For example, the inert liquid diluent may be separated from the ion exchange resin and the polymeric material by simple filtration, or centrifuging and the polymer may be separated from the ion exchange resin by classification, tabling, jiggling, flotation, etc. The preferred method of separation is carried out as follows:

The mixture of ion exchange resin, polymer and diluent is passed into a standard classifier, wherein the larger particles of ion exchange resin are allowed to settle out, being washed countercurrently with a small stream of clean diluent. The diluent and polymer are then passed to a filter or centrifuge, which separates polymer from diluent. If desired, a secondary classification can follow the first classification to remove particles of fractured ion exchange resin and a small amount of the largest sized polymer particles. In this arrangement, the first classifier would be run at condition to yield a maximum yield of ion exchange resin, and the second operated to give an extremely clean separation (with a small loss in yield) of resin fragments from the polymer. The treating of the reaction mixture with ion exchange resin in treater 60 and the subsequent separation of the materials in separator 70 may be carried out on either a batch or continuous basis, as desired.

In another embodiment of the present invention, the polymeric product which is separated by filtration from the inert liquid diluent in filter 30 is passed through lines 39 and 79 to treater 80 which is provided with agitator 81 operated by motor 82. Ion exchange resin is introduced into treater 80 through line 84, and washing agent is introduced through line 86. The contents of treater 80 are then thoroughly mixed by means of agitator 81. Generally, the contacting of the polymeric material with the washing agent and ion exchange resin is carried out at a temperature of about atmospheric to 250° F. (e.g. about 120 to 200° F.) in treater 80. The residence time of the polymeric material in treater 80 will generally be about 15 minutes to 2 hours, preferably about 30 minutes to 1 hour. About 10 to 200, preferably about 50 to 160 parts by volume of polymer-wash solution mixture are employed in treater 80 per part by volume of ion exchange resin. About 5 to 25, preferably about 10 to 20, parts by volume of washing agent will be employed in treater 80 per part by volume of polymeric material. The mixture in treater 80 is then passed through line 88 to separator 90 wherein the polymeric product is separated from the ion exchange resin and the washing agent. The polymeric product is then passed through lines 91 and 52 to drier 53 and thereafter through lines 54 to packaging apparatus 55 and is withdrawn therefrom through line 56. The washing agent is withdrawn from separator 90 through line 93 and is passed through line 45 to tank 42. The washing agent may then be recycled through lines 41 and 86 to treater 80. However, preferably the washing agent is recycled through lines 41, 46, bed 48 of ion exchange resin and lines 49 and 86 to treater 80. The ion exchange resin is withdrawn from separator 90 through line 95 and may then be regenerated and then recycled through line 84 to treater 80. The method of separation employed in separator 90 may be the same as that described heretofore for separator 70.

The ion exchange resins employed as described above for removing metal contaminants from the polymeric material, inert liquid diluent and/or washing agent may be regenerated by techniques well known in the art. This may be accomplished by displacing the diluent and/or washing liquid with solvents of increasing polarity, then water containing about 10% HCl or $H_2SO_4$, followed by displacement of the water phase with solvents of decreasing polarity until the liquid phase was diluent and/or washing liquid.

However, preferably the ion exchange resins are regenerated by treatment with a halogen acid in a non-aqueous solvent. Preferably the halogen acids are anhydrous HCl or HBr and the non-aqueous solvent is a hydrocarbon such as heptane or benzene or a chlorinated solvent such as chloroform or carbon tetrachloride. If desired, non-aqueous solvents such as those described heretofore as being useful as inert liquid diluents in the polymerization process may be employed in the regeneration. Generally, the regeneration step is carried out at a temperature of about 60 to 250° F., preferably about room temperature. The regeneration may be carried out on either a batch basis or a continuous basis. The amount of anhydrous halogen acid employed should be sufficient to remove at least about 50%, preferably at least about 90%, and more preferably at least about 99%, of the metal contaminants held by the ion exchange resin. The regeneration is preferably carried out in non-aqueous media in order that subsequent diluent and/or washing alcohol treated with the resin will not contain traces of water, since water has been found to be a powerful catalyst poison, and to inhibit the washing efficiency of alcohols, even when present in concentrations of 10–100 p.p.m.

The invention will be more fully understood by reference to the following examples. It is pointed out, however, that the examples are given for the purpose of illustration only and are not to be construed as limiting the scope of the present invention in any way.

*Example I*

A polyethylene product having a molecular weight of about 43,000 was prepared in the following manner:

Into a 100 gallon stainless steel, agitated, jacketed autoclave were introduced 25 gallons of a dried acid washed petroleum fraction boiling between 400–500° F.
563 grams of $TiCl_4$
176 grams of $AlEt_2Cl$ After agitating the mixture for 15 minutes at 78° F., 15 additional gallons of diluent were added, and ethylene gas, at substantially atmospheric pressure was introduced through diplegs into the reactor at a rate of 8–10 lbs./hr. Simultaneously, the reactor contents was heated to 175° F. by introducing hot water into the reactor jacket. Thereafter, the temperature was maintained at this level by adjusting the jacket water temperature. After 12 hours, ethylene was cut out, and a sample of the reactor contents was withdrawn. This slurry is designated "A." Five gallons of n-butanol were then added to the reactor to terminate the polymerization reaction.

A portion of slurry, "A," was taken and the polyethylene removed therefrom by filtering said slurry through a fritted glass filter while keeping the entire system under a blanket of nitrogen gas. The polyethylene, allowed to drain dry, is hereinafter designated "B." The separated reactor effluent from the filtration step is designated "C."

Reactor effluent "C" was treated with an ion exchange resin manufactured by the Rohm and Haas Company of Philadelphia and sold under the trade name of Amberlite IR–120.

This ion exchange resin contains about 92 wt. percent styrene monomer and about 8 wt. percent divinyl benzene monomer (based on unsulfonated resin) and is sulfonated to incorporate about 40 wt. percent sulfonate groups based on total dry sulfonated resin. Prior to the treating of the reactor effluent, the ion exchange resin was converted to the acid form as follows:

(1) Rinsed 4 times with 10 volumes of 10% HCl to convert to acid form.
(2) Rinsed with distilled water to neutrality.
(3) Rinsed 3 times with 70% isopropanol.
(4) Rinsed 3 times with 99% isopropanol.
(5) Rinsed 3 times with 99% n-butanol.
(6) Rinsed 3 times with (anhydrous) light petroleum distillate.

Reactor effluent "C" was then treated with the acid form of the above-described ion exchange resin in the following manner: 5 parts by volume of resin were placed in a separating vessel and 50 parts of the material to be treated was poured over it. A cock at the base of the separating vessel was then cracked open sufficiently to drain off the liquid and retain the solids. Total efflux times were in the range of 5–10 minutes.

The efficiency of metal removal is shown below:

| Treatment | Wt. percent Al | Wt. percent Ti | Wt. percent Fe |
|---|---|---|---|
| None | 0.062 | 0.047 | 0.067 |
| Resin Treated | 0.00008 | 0.00004 | 0.00001 |

The above data show that the metals content of a diluent stream can be reduced to an essentially negligible amount by passing it over a bed of ion exchange resin. The data also show that no further treatment of the diluent is required to render it fit for use as recycle diluent. Small amounts of other metals such as iron occurring as impurities may also be removed in this manner.

*Example II*

Normal butanol was employed to wash the filtered polymeric product "B." The filtered polymer "B" was transferred to a washing tank and slurried with $n-C_4H_9OH$ at 180–200° F. for one hour and drained. The washed polymer was then re-slurried in n-butanol in similar fashion and washed a second time. A portion of the first wash alcohol was then thoroughly mixed with the acid form ion exchange resin (10 volumes alcohol/volume resin) for about 10 minutes and then separated by decantation. (Step 6 in the preparation of the resin was omitted in this example.)

The efficiency of metal removal from the wash alcohol by contacting it with the ion exchange resin is shown below:

| Treatment | Wt. percent Al | Wt. percent Ti | Wt. percent Fe |
|---|---|---|---|
| None | 0.007 | 0.014 | 0.001 |
| Resin Treated | 0.001 | 0.004 | 0.0001 |

The above data show that the metals content of the wash alcohol can be reduced by passing the alcohol over ion exchange resin to a low enough limit to permit its reuse without further treatment.

What is claimed is:

1. A process of preparing a solid plastic which comprises polymerizing a $C_2$—$C_3$ monoolefinic hydrocarbon in a polymerization stage in the presence of an inert hydrocarbon diluent and a polymerization catalyst obtained by mixing titanium tetrachloride with an aluminum compound of the formula $Al(C_2H_5)_2R$ wherein R is of the class consisting of ethyl and chlorine, mechanically separating the resulting reaction mixture in an atmosphere of nitrogen into a solid polymer portion and a liquid diluent portion containing some metal compounds dissolved therein, passing the separated diluent portion at substantially atmospheric temperature through a bed of an ion exchange resin in its acid form comprised of a sulfonated copolymer of about 92% styrene and 8% divinyl benzene, and recycling the resin treated diluent to the polymerization stage.

2. A process of preparing a solid plastic which comprises polymerizing a $C_2$—$C_3$ monoolefinic hydrocarbon in a polymerization stage in the presence of an inert hydrocarbon diluent and a polymerization catalyst obtained by mixing a titanium chloride with an aluminum compound of the formula $Al(C_2H_5)_2R$, wherein R is of the class consisting of ethyl and chlorine, mechanically separating the resulting reaction mixture in an atmosphere of nitrogen into a solid polymer portion and a liquid diluent portion containing some metal compounds dissolved therein, passing the separated diluent portion at substantially atmospheric temperature through a bed of an ion exchange resin in its acid form and recycling the resin treated diluent to the polymerization stage.

3. Process according to claim 2 wherein said polymeric product is polyethylene.

References Cited in the file of this patent

UNITED STATES PATENTS

| | | |
|---|---|---|
| 2,366,007 | D'Alelio | Dec. 26, 1944 |
| 2,367,803 | Schindler | Jan. 23, 1945 |
| 2,409,996 | Roedel | Oct. 22, 1946 |
| 2,441,423 | Elliott | May 11, 1948 |
| 2,478,154 | Evans | Aug. 2, 1949 |
| 2,485,270 | Folt | Oct. 18, 1949 |
| 2,733,204 | Costa | Jan. 31, 1956 |

FOREIGN PATENTS

| | | |
|---|---|---|
| 533,362 | Belgium | May 16, 1955 |

OTHER REFERENCES

Kumin: Ion Exchange Resins—1951, page 139.

"Ion Exchange Technology" (Nachod et al.), published by Academic Press Inc. (New York) 1956, page 296 relied on.

Journal of the American Chemical Society (Ayres) November 1947 (volume 69, page 2879 et seq. relied on).

Industrial and Engineering Chemistry (Bodomer et al.) November 1953 (vol. 45, pages 2577–2580 relied on).

Chemical and Engineering News (Konin), August 2, 1954 (volume 32, pages 3046–3050).

Chemical Engineering (Heister) October 1954, pages 161–180.